Patented Jan. 23, 1945

2,368,082

UNITED STATES PATENT OFFICE 2,368,082

1:2 ALKYLENE IMINE CONDENSATION PRODUCTS

Heinrich Ulrich, Ludwigshafen-on-the-Rhine, Germany, assignor, by mesne assignments, to General Aniline & Film Corporation, New York, N. Y., a corporation of Delaware No Drawing. Application December 12, 1940, Serial No. 369,865. In Germany August 7, 1935

23 Claims. (Cl. 260—239)

The present application is a continuation-in-part of application Ser. No. 93,767, filed in the name of Heinrich Ulrich on August 1, 1936, now Patent No. 2,272,489, issued February 10, 1942.

The present invention relates to new nitrogenous condensation products and a process of producing same.

I have found that very valuable nitrogenous products are obtained by causing monomeric 1.2-alkylene imines (ethylene imines) to react with organic compounds free from carboxylic and modified carboxylic groups and containing at least 6 carbon atoms in the molecule and at least one halogen atom attached to a carbon atom devoid of oxygen directly attached thereto. For example ethylene imine, methylethylene imine, alpha-beta-butylene imine and alpha-beta-do-decylene imine are suitable for the process. The 1.2-alkylene imines may be caused to react for example with organic, for example aliphatic, hydroaromatic, aliphatic-aromatic or aromatic halogenated hydrocarbons, such as hexyl chloride, decyl chloride, dodecyl chloride, octodecyl chloride, dichloroctodecane or mixtures of corresponding compounds such as may be obtained from mixtures of fatty acids of natural origin by reduction to alcohols and replacement of the hydroxyl groups by halogen. Suitable aliphatic-aromatic and aromatic halogenated hydrocarbons are for example triphenylbromomethane and 9.10-dichlorantheracene. Organic compounds which besides the halogen contain further substituents may also be employed, for example chlormethylbenzene sulphonic acid, dinitrochlorbenzene and nitrobenzyl chloride.

The reaction conditions are adapted to the initial materials employed. The reaction usually takes place at temperatures between room temperature and 100° C., as for example at from 50° to 60° C., but higher, or in the case of especially reactive initial materials, lower temperatures may be advantageous. Equimolecular proportions of the initial materials may be allowed to react with each other or one of the components may be caused to react in excess. Depending on the nature and relative proportions of the initial materials, and in some cases on the reaction conditions, products which are soluble or insoluble in water can be obtained. The use of solvents or diluents, as for example water, alcohol, ether, cyclohexanone, toluene, carbon tetrachloride or chlorbenzene is frequently of advantage. The reaction may be carried out under increased pressure; especially when initial materials are employed which react only with difficulty it is preferable to carry out the condensation in a closed vessel under pressure. It may be advantageous to work in the presence of condensing agents, preferably acid-binding agents.

It may be of advantage to condense the 1.2-alkylene imines simultaneously with two or more of the said halogen compounds or first with one of the said compounds, the reaction product being condensed with another reactive substance. Products which are still basic may be employed in the form of salts with mineral or organic acids, as for example with fatty acids.

The condensation products of 1.2-alkylene imines with the said halogenated compounds may be subsequently peralkylated, or substituents, as for example sulphonic, sulphuric ester or phosphoric acid groups, may be introduced. The introduction of the said substituents may also be effected by employing, for the reaction with the 1.2-alkylene imines, compounds which already contain the desired substituents. A further modification in treatment consists in acylating the finished condensation products or one or both of the initial components with sulphonic acid chlorides, as for example toluene sulfochloride. Furthermore two or more of the said methods of treatment may be combined together or carried out consecutively.

The products obtainable according to this invention are colorless or slightly colored viscous liquid, or wax-like, or solid substances many of which are difficultly soluble or insolube in water but soluble in organic solvents, the nature of the products obtained depending on the initial materials and working conditions employed.

The products are suitable for a great variety of purposes; for example they may serve alone or together with other suitable substances as assistants for the pharmaceutical, cosmetic, textile, leather, lacquer, rubber and like industries. For example they may be added with advantage to the spinning baths in the preparation of artificial silk; they increase the affinity of artificial silk to acid dyestuffs. The products may also be employed as additions in dyeing, printing, dressing, stripping, fulling, levelling, washing, dispersing and wetting or as softening or flotation agents. Some of the products impart a water-repelling action to textiles treated therewith. They increase the fastness to water and washing of dyeings. The condensation products may also be employed in tanning. In many cases it is preferable to employ the products in a dissolved or dispersed form, for example while employing dispersing agents, as for example salts of the sulphuric esters of fatty alcohols or true sulphonic acids of aliphatic compounds of high molecular weight.

The following examples will further illustrate the nature of this invention but the invention is not restricted to these examples. The parts are by weight.

Example 1

43 parts of monomeric ethylene imine and 250 parts of the mixture of alkyl bromides corresponding to the fatty acids contained in palm kernel oil are heated under reflux condensation at from about 50° to 60° C. for three hours while stirring. As soon as a sample withdrawn from the reaction mixture is soluble in water to give a clear solution, the reaction is interrupted.

Example 2

400 parts of monomeric ethylene imine are mixed while stirring in a closed vessel with 40 parts of a chlorinated paraffin wax containing about 3 chlorine atoms per molecule. The temperature rises up to from 110° to 120° C. After 4 hours small amounts of unreacted ethylene imine are distilled off. A practically colorless product is thus obtained which is very suitable for the after-treatment of dyeings.

By reacting the product with benzyl chloride or dimethyl sulphate in order to convert it into a compound of the type of quaternary ammonium compounds water-soluble products may be obtained which are very suitable for incorporation with artificial silk spinning masses or for the after-treatment of artificial silk.

Example 3

400 parts of monomeric C-butylethylene imine (or N-butylethylene imine) are reacted at 30° C. with 40 parts of dinitrochlorbenzene. During the reaction the temperature is raised to about 100° C. The reaction product as well as the diamino compound obtainable therefrom by reduction may be employed with advantage in the production of artificial silk. The products may be incorporated with artificial silk spinning masses or the ready-made artificial silk may be after-treated therewith.

Example 4

400 parts of monomeric C-butylethylene imine $$\left(\begin{array}{c}CH_3\text{---}CH_2\text{---}CH_2\text{---}CH_2\text{---}CH\text{---}CH_2\\ \diagdown\diagup\\ NH\end{array}\right)$$

are reacted with 166 parts of chloroethane sulphonic acid sodium salt. The condensation product obtained is treated with 337 parts of octodecyl bromide. Valuable assistants for the textile industry are thus obtained which may be used for example as softening agents, washing agents and as additions in the stripping of dyeings. Instead of the octodecyl bromide 287 parts of octodecenyl chloride or 120 parts of hexylchloride or equivalent amounts of similar compounds may be used, similar products thus being obtained.

Example 5

220 parts of monomeric N-propylethylene imine (or C-propylethylene imine) are reacted with 110 parts of monoglycerine chlorhydrin. A highly viscous reaction product is obtained into which a high molecular aliphatic radicle (for example by reacting it with dodecyl bromide or alkyl bromide mixtures corresponding to naturally occurring fatty acid mixtures) is introduced. Products are thus obtained which are very suitable for producing a water-repelling action.

Instead of propylethylene imine N-phenylethylene imine may be employed, whereby products are obtained which may also be used as assistants in the textile and related industries.

Example 6

200 parts of monomeric ethylene imine are heated under reflux cooling. 171 parts of nitrobenzylchloride are added by and by. The temperature is allowed to rise slowly from 40° to about 120° C. The product obtained may be alkylated by treatment with dimethyl sulphate or reacted with chloroethane sulphonic acid or sulphonating agents, valuable assistants for the textile industry thus being obtained.

Example 7

10 parts of 3-bromoquinoline are heated together with 9 parts of monomeric ethylene imine in a closed vessel for about 20 hours at 160° C. A viscous water-soluble product is obtained the alcoholic solution of which possesses an acid reaction towards phenolphthalein.

Example 8

4 parts of 9.10-dichloranthracene are heated with 3 parts of ethylene imine in a closed vessel for 5 hours at 160° C. A slightly brownish tough mass is obtained which is soluble in benzene and in alcohol. The alcoholic solution of the product possesses an acid reaction towards phenolphthalein.

Example 9

25 parts of triphenylbromomethane are dissolved in 16 parts of monomeric ethylene imine in the cold and heated to about 50° to 60° C. At this temperature an intense reaction sets in which leads to the formation of a yellowish mass which is soluble in water to form a turbid solution.

What I claim is:

1. The process of producing nitrogenous products which comprises causing a monomeric 1.2-alkylene imine to react with an organic compound free from carboxylic groups and modified carboxylic groups and containing at least 6 carbon atoms in the molecule and at least one halogen atom attached to a carbon atom devoid of oxygen directly attached thereto.

2. The process of producing nitrogenous products which comprises causing a monomeric 1.2-alkylene imine to react with a halogenated hydrocarbon containing at least 6 carbon atoms in the molecule.

3. The process of producing nitrogenous products which comprises causing a monomeric 1.2-alkylene imine to react with a halogenated aliphatic hydrocarbon containing at least 6 carbon atoms in the molecule.

4. The process of producing nitrogenous products which comprises causing a monomeric 1.2-alkylene imine to react with a mixture of halogenated aliphatic hydrocarbons containing at least 6 carbon atoms in the molecule.

5. The process of producing nitrogenous products which comprises causing a monomeric 1.2-alkylene imine to react with an aromatic compound containing at least one halogen atom attached to a carbon atom devoid of oxygen directly attached thereto.

6. The process of producing nitrogenous products which comprises causing a monomeric 1.2-alkylene imine to react with an aliphatic-aromatic compound free from carboxylic groups and modified carboxylic groups and containing at least one halogen atom attached to a carbon atom devoid of oxygen directly attached thereto.

7. Nitrogenous condensation products obtained by condensing monomeric 1.2-alkylene imines with organic compounds free from carboxylic groups and modified carboxylic groups and containing at least six carbon atoms in the molecule with at least one halogen atom attached to a carbon atom devoid of oxygen directly attached thereto.

8. Nitrogenous condensation products obtained by condensing monomeric 1.2-alkylene imines with halogenated hydrocarbons containing at least 6 carbon atoms in the molecule.

9. Nitrogenous condensation products obtained by condensing monomeric 1.2-alkylene imines with halogenated aliphatic hydrocarbons containing at least 6 carbon atoms in the molecule.

10. Nitrogenous condensation products obtained by condensing monomeric 1.2-alkylene imines with mixtures of halogenated aliphatic hydrocarbons containing at least 6 carbon atoms in the molecule.

11. Nitrogenous condensation products obtained by condensing monomeric 1.2-alkylene imines with aromatic compounds containing at least one halogen atom attached to a carbon atom devoid of oxygen directly attached thereto.

12. Nitrogenous condensation products obtained by condensing monomeric 1.2-alkylene imines with aliphatic-aromatic compounds free from carboxylic groups and modified carboxylic groups and containing at least one halogen atom attached to a carbon atom devoid of oxygen directly attached thereto.

13. The process as defined in claim 1 wherein the reaction is effected at a temperature ranging from room temperature to about 120° C.

14. The process as defined in claim 3 wherein the reaction is effected at a temperature ranging from room temperature to about 120° C.

15. The process as defined in claim 5 wherein the reaction is effected at a temperature ranging from room temperature to about 120° C.

16. The process as defined in claim 1 wherein the reaction is effected with equimolecular proportions of the reactants.

17. The process as defined in claim 1 wherein the alkylene imine is reacted with a chlorinated aliphatic compound containing a water-solubilizing group and with said organic compounds containing at least six carbon atoms.

18. Nitrogenous condensation products obtained by condensing monomeric 1.2-alkylene imines with organic compounds having at least six carbon atoms in the molecule and having at least one halogen atom attached to a carbon atom which is devoid of oxygen directly attached thereto, and which compound is free from carboxylic groups and modified carboxylic groups, and alkylating the resulting product with an alkylating agent selected from the group consisting of benzyl chloride and dialkylsulfates.

19. Nitrogenous condensation product obtained by condensing monomeric 1.2-alkylene imines with chlorinated paraffin wax, and alkylating the resulting product with an alkylating agent selected from the group consisting of benzyl chloride and dialkylsulfate.

20. The process which comprises condensing a monomeric 1.2-alkylene imine with an organic compound having at least six carbon atoms in the molecule and having at least one halogen atom attached to a carbon atom which is devoid of oxygen directly attached thereto, and which compound is free from carboxyl groups and modified carboxyl groups, and alkylating the resulting product with an alkylating agent selected from the group consisting of benzyl chloride and dialkylsulfates.

21. The process which comprises reacting a monomeric 1.2-alkylene amide with chlorinated paraffin wax, and alkylating the resulting product with an alkylating agent selected from the group consisting of benzyl chloride and dimethylsulfate.

22. Nitrogenous condensation products obtained by condensing monomeric 1.2-alkylene imines with a chlorodinitrobenzene.

23. Nitrogenous condensation products obtained by condensing monomeric 1.2-alkylene imines with chloroethane sulfonic acid sodium salt and the halide of an aliphatic hydrocarbon containing at least 6 carbon atoms in the molecule.

HEINRICH ULRICH.